Patented Dec. 26, 1950

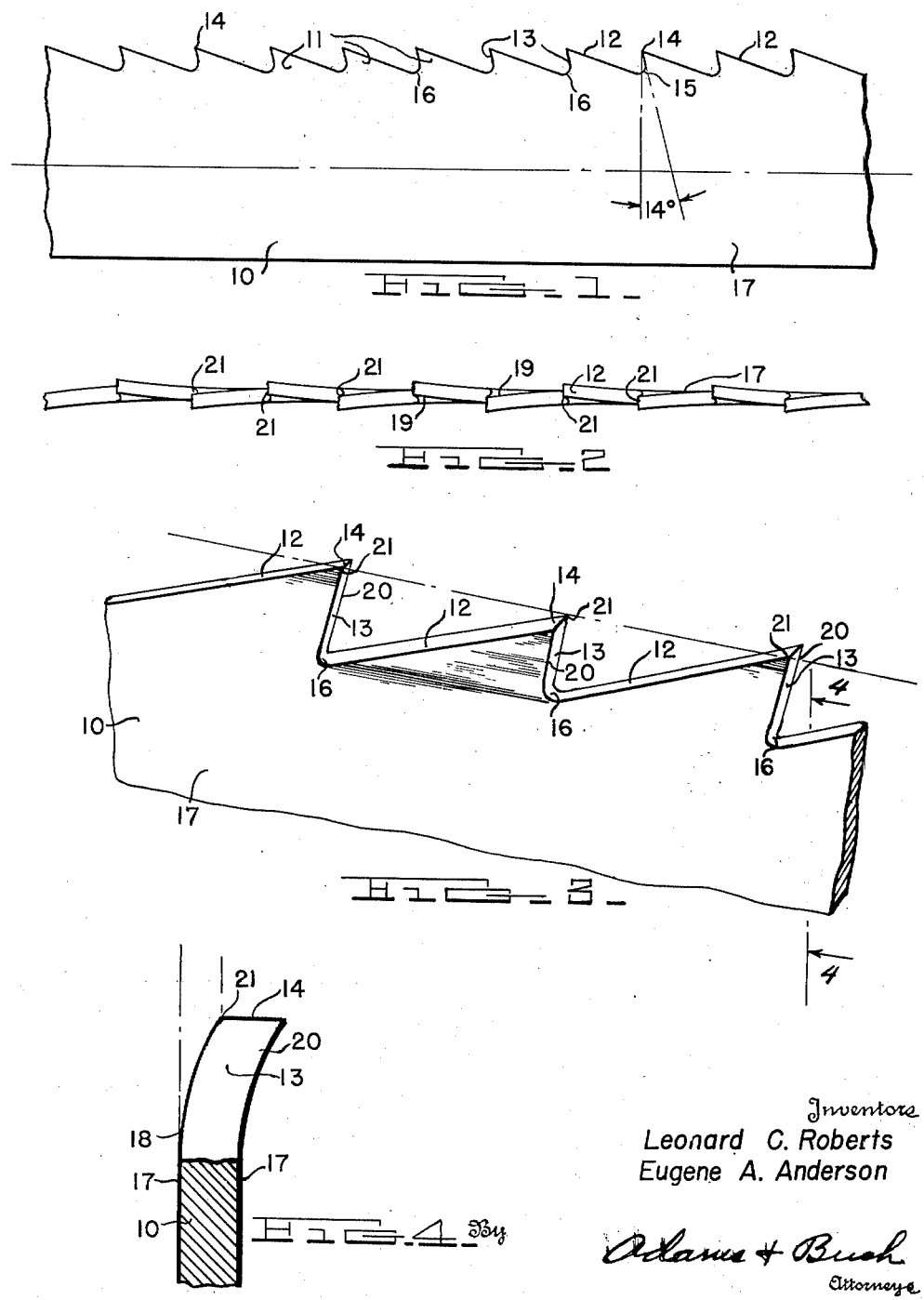

2,535,714

UNITED STATES PATENT OFFICE 2,535,714

MEAT SAW

Eugene A. Anderson and Leonard Charles Roberts, Atlanta, Ga., assignors to Southern Saw Service, Inc., Atlanta, Ga., a corporation of Georgia Application April 16, 1947, Serial No. 741,722

2 Claims. (Cl. 143—133)

This invention relates to saws and has more particular reference to tooth construction of saws particularly designed for cutting meat.

The ordinary saws used in cutting meat, particularly those of the power driven band saw type, have several objectionable features, among the most objectionable of which are, the raising of the surface temperature of the meat to such a degree as to cause undesirable discoloration, the leaving of ridges on the surface of the meat by the teeth as they pass over the material and the smearing of fat over the cut surfaces of the meat.

One of the objects of the present invention is to provide a meat cutting saw having a tooth construction which will overcome these defects.

Another object of the present invention is to provide a meat cutting saw having teeth which are alternately offset laterally to the right and left of the blade and bent or twisted outwardly through a small angle at their tips to provide cutting clearance for each tooth and the blade and thereby reduce surface friction.

Another object of the present invention is to provide a meat cutting saw as above characterized in which the inner points of the tips of the teeth are in substantial alignment with respect to the direction of the cutting movement of the blade, thereby preventing the formation of ridges on the cut material.

A further object of the invention is to provide a meat cutting saw as above characterized in which the leading or front surface of each tooth extends downwardly and rearwardly from the tip to the root at an acute angle from the vertical and in which the juncture of the front or leading surface of each tooth with the upper or trailing surface of the preceding tooth is rounded to provide a gullet for the reception of the meat dust, thereby substantially preventing the meat dust from being rubbed into the side walls of the kerf.

Other objects and advantages of the invention will appear in the specification when considered in connection with the accompanying drawing, wherein:

Fig. 1 is an elevational view of a portion of a band saw constructed in accordance with the present invention;

Fig. 2 is a plan view of the portion of the saw shown in Fig. 1;

Fig. 3 is an enlarged perspective view of a fragmentary portion of the saw shown in Fig. 1; and Fig. 4 is a vertical sectional view, taken on line 4—4 of Fig. 3.

Referring now to the drawing, there is shown in Fig. 1, a fragmentary portion of a saw constructed in accordance with the present invention and comprising a blade 10 having integral spaced teeth 11 formed along one edge. Each tooth is formed with a flat upper or trailing surface 12 and a flat front or leading surface 13 which join to form the tip 14 of the tooth. The leading surface 13 extends downwardly and rearwardly from the tip to the root 15 at an acute angle from the vertical or from a plane passing through the tip of the tooth and extending perpendicularly to the longitudinal axis of the blade. In the particular embodiment shown, the angle of inclination from the vertical is 14° as shown in Fig. 1.

The trailing surface 12 of the tooth extends from the tip 14 to the base of the preceding tooth in a plane inclined to the longitudinal axis of the blade and the juncture of the trailing surface 12 of one tooth with the leading surface 13 of the preceding tooth is rounded to form a gullet 16.

The teeth are set by alternately offsetting them laterally to the right and left of the lateral surfaces 17 of the blade and simultaneously twisting or bending them outwardly through an angle of about 6° at their tips. This results in curving the trailing and leading surfaces 12, 13 of the teeth, as indicated at 19 and 18, respectively, in Figs. 2 and 4. It will be observed that the base of the teeth remain straight. The foregoing construction and arrangement of the teeth provides adequate clearance for the lateral surfaces of the teeth and blade and also provides clearance for the greater portion of the outer edges 20 of the teeth, thereby reducing surface friction.

In order to prevent the formation of ridges as the teeth pass over the material, the amount of lateral offset and twist of the teeth is made uniform, so that the inner points 21 of the teeth tips will be in substantial horizontal alignment with respect to the direction of cutting movement of the saw, as shown in Fig. 3.

A saw having a tooth construction and arrangement as above described will not smear the side walls of the kerf with fat, as the meat dust tends to be pocketed in the gullet and to be pulled along therewith as the saw passes through the meat. This tends to prevent the dust from passing down the sides of the saw blade to fill the previously formed part of the kerf and to be rubbed into the side walls of the kerf. In addition, the surface temperature of the meat will be raised only slightly, due to the cutting clearance provided for each tooth and for the body of the blade. Also, the formation of ridges on the cut surface of the meat is prevented by having the outer points of the teeth tips located in substantial alignment.

Having thus described the invention, what is claimed is:

1. A band saw for cutting meat and the like, comprising a blade having angular teeth with sharp tips and with gullets between the teeth, said teeth having leading edges extending rearwardly at acute angles from the tips to the gullets; alternate teeth being oppositely offset angularly relative to the plane of the blade; and the tip portion of each tooth being twisted and further angularly offset to provide clearances from the tip toward the gullet and from the leading cutting edge to the trailing edge.

2. A band saw, as set forth in claim 1, wherein the gullets between the teeth are rounded; and wherein the alternate offset tips of the teeth on each side of the blade are in substantial alignment in the direction of cutting movement of the saw.

EUGENE A. ANDERSON.
LEONARD CHARLES ROBERTS.

REFERENCES CITED

The following references are of record in the file of this patent:

UNITED STATES PATENTS

| Number | Name | Date |
| --- | --- | --- |
| 511,473 | Szekely | Dec. 26, 1893 |
| 813,371 | Fleming | Feb. 20, 1906 |
| 1,649,864 | Sherman | Nov. 22, 1927 |
| 1,736,560 | Walker | Nov. 19, 1929 |
| 2,120,963 | Biro | June 21, 1938 |